(No Model.)
A. SCHMIDT.
PURIFICATION OF CRUDE ACETIC ACID.
No. 595,787. Patented Dec. 21, 1897.
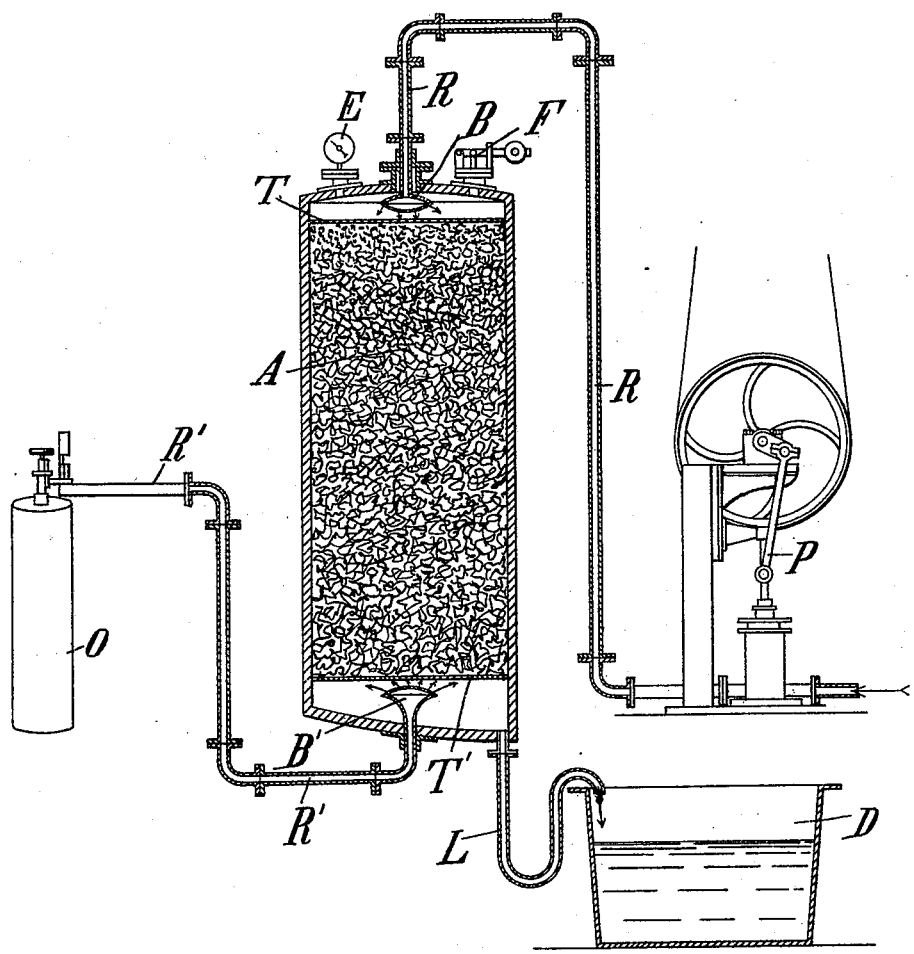
Witnesses.
Inventor.
Adolf Schmidt
by Richardson
Attorneys.

UNITED STATES PATENT OFFICE.

ADOLF SCHMIDT, OF CASSEL, GERMANY.

PURIFICATION OF CRUDE ACETIC ACID.

SPECIFICATION forming part of Letters Patent No. 595,787, dated December 21, 1897.

Application filed November 30, 1896. Serial No. 613,991. (No specimens.) Patented in England November 9, 1896, No. 25,100.

*To all whom it may concern:*

Be it known that I, ADOLF SCHMIDT, managing director, a citizen of the Kingdom of Prussia, German Empire, and a resident of 49 Köllnischestrasse, Cassel, in the Kingdom of Prussia, Germany, have invented certain new and useful Improvements in the Purification of Crude Acetic Acid, of which the following is a specification.

This invention has been patented to me in England November 9, 1896, No. 25,100.

For the oxidation and purification of the empyreumatical constituent parts contained in crude acetic acid, such as tar or sulfurous acid, heretofore oxygen-discharging chemicals have been generally employed. This process is very expensive and is accompanied by considerable losses of acetic acid.

The present invention has for its object to obviate the defects mentioned, through oxidation of the crude acetic acid in convenient apparatus, by means of commercially-pure oxygen. It is necessary in this process to hold the crude wood-acid in a warm state and to saturate oxygen under pressure until the perfect purification of the acetic acid is attained. A high strong-walled carbon filter is used, having inside an acid-proof coating, and being provided with the necessary fittings, as safety-valves, pressure-gage, &c. The top of the filter is in connection with a pressure-pump, by means of which the crude acetic acid is pumped in. The bottom of the filter is connected with a steel cylinder filled with oxygen gas and having, furthermore, an exit-tube at the bottom. The filter is filled in a convenient manner with charcoal or coke of the size of a nut and thereafter closed. A thin stream of oxygen gas is introduced into the apparatus through a reduction-valve and then the acetic acid which is to be treated pumped into the filter from the top in a thin stream by means of a pressure-pump. The acetic acid being finely distributed over the filter-bed remains in the most intimate contact with the oxygen during its whole way through the filter, which oxygen oxidizes the tarry constituents to insoluble empyreumatic resins, which remain in the filter-bed.

In the accompanying drawing I show the apparatus for carrying out my process.

A is the carbon filter; B, the rose or a spray in connection with the inlet-pipe R, through which the crude acetic acid is introduced by means of a pump P into the upper part of the apparatus above the perforated plate T. This plate is intended to distribute the acid over the filter. Near the under part of the filter A there is arranged another plate T', on which the charcoal filling rests, and which is intended to separate the entering oxygen through the rose B in such a way that it passes through all parts of the carbon filter uniformly. The pipe R' is connected with the rose B, through which the oxygen is conveyed out of the gas-receiver O into the apparatus. The purified acid collects on the bottom of the receiver A and flows through the pipe L, which is bent in the shape of a deep U, according to the pressure in the apparatus, into the receiver D.

E is a manometer for controlling the pressure in the filter, and F is a safety-valve for the purpose of having the oxygen blowoff in case a certain pressure-limit is exceeded.

If it relates to the purification of crude acetic acid produced by the action of sulfuric acid on calcium acetate, the process is worked in such a way that this crude acetic acid, which contains always certain quantities of sulfuric acid with sulfurous acid, is also submitted to the action of the oxygen in the apparatus described above. Thereby the sulfurous acid is oxidized in the quickest way to sulfuric acid and an acetic acid collects in the receiver D, which will contain sulfuric acid, from which it is freed by distillation over acetate of sodium.

I claim—

The herein-described process consisting in finely dividing or distributing the acetic acid in contact with coal or coke and in forcing pure oxygen gas through the bed of coal in an opposite direction.

In testimony that I claim the foregoing as my invention I have signed my name in presence of two witnesses.

ADOLF SCHMIDT. [L. S.]

Witnesses:
PAUL HAEPKER,
HERMANN KENTING.